United States Patent
Cardi et al.

Patent Number: 5,629,391
Date of Patent: May 13, 1997

[54] PROCESS FOR THE PREPARATION OF CRYSTALLINE VINYLAROMATIC POLYMERS WITH A PREDOMINANTLY SYNDIOTACTIC STRUCTURE

[75] Inventors: Nicoletta Cardi, Novara; Riccardo Po', Leghorn; Roberto Santi, Rosignano Marittmo; Giuseppe Cometti, Verbania Pallanza, all of Italy

[73] Assignee: Enichem S.p.A., Milan, Italy

[21] Appl. No.: 654,202

[22] Filed: May 28, 1996

[30] Foreign Application Priority Data

Jun. 30, 1995 [IT] Italy ............... 00139995/A

[51] Int. Cl.$^6$ ............... C08F 4/643; C08F 4/642; C08F 12/08
[52] U.S. Cl. ............... 526/133; 526/134; 526/151; 526/153; 526/161; 526/165; 526/346; 526/347.2; 502/103; 502/167
[58] Field of Search ............... 526/133, 134, 526/161, 165, 151, 153, 347.2

[56] References Cited

U.S. PATENT DOCUMENTS 5,378,778  1/1995  Johoji et al. ............... 526/161 X

FOREIGN PATENT DOCUMENTS 0272584  6/1988  European Pat. Off. .
0271874  6/1988  European Pat. Off. ............... 526/161
0554574  8/1993  European Pat. Off. .

*Primary Examiner*—Fred Teskin
*Attorney, Agent, or Firm*—Oblon, Spivak, McClelland, Maier & Neustadt, P.C.

[57] ABSTRACT

Process for the preparation of crystalline vinylaromatic polymers with a predominantly syndiotactic structure which comprises polymerizing the vinylaromatic monomers in the presence of a catalytic system consisting essentially of:

a) a complex of titanium having the formula (I):

$$Ti(OCONRR')_n \quad (I)$$

wherein R and R', the same or different, represent a $C_1$–$C_{12}$ aliphatic radical or $C_6$–$C_{12}$ aromatic radical whereas n is an integer equal to 3 or 4;

b) a cocatalyst selected from aluminoxane and a compound of boron having formula (II):

$$BX_1X_2X_3 \quad (II)$$

wherein $X_1$, $X_2$ and $X_3$, the same or different, represent a $C_1$–$C_{20}$ perfluorinated hydrocarbon radical.

8 Claims, No Drawings

PROCESS FOR THE PREPARATION OF CRYSTALLINE VINYLAROMATIC POLYMERS WITH A PREDOMINANTLY SYNDIOTACTIC STRUCTURE

The present invention relates to a process for the preparation of crystalline vinylaromatic polymers having a predominantly syndiotactic structure.

More specifically, the present invention relates to a process for the preparation of crystalline polystyrene wherein the polymeric chains have a basically syndiotactic configuration.

Polystyrene is a thermoplastic polymer obtained by the radicalic polymerization f styrene and is used in the production of moulded articles, films, electrical materials, materials for packaging, etc. It is an amorphous, atactic polymer with excellent insulating properties and reasonable thermal resistance. For many applications it is preferable however to use crystalline materials, with a high thermal resistance and resistance to solvents, characteristics which atactic polystyrene does not have.

European patent 210.615 describes a polystyrene having a structure characterized by a high degree of stereoregularity, in which the phenylic substituents are so arranged as to give a syndiotactic polymer. This material does not have the above inconveniences of atactic polystyrene as it is crystalline and consequently, once transformed, can be subjected to orientation processes, it is almost completely insoluble in organic solvents and has a melting point within the range of 260°–280° C., giving it a high thermal resistance, equal to or higher than that of condensation thermoplastic polymers (polyesters, polyamides, polyimides, etc.).

Syndiotactic polystyrene can be prepared according to what is described in literature, for example, European patent EP 272.584 or U.S. Pat. No. 4.978.730, by polymerization catalyzed by compounds of Ti, Zr, V, Ni, in the presence of a cocatalyst represented by a methylaluminoxane (a mixture which can contain cyclic oligomers, linear or cage-shaped, containing the repetitive unit $-AlCH_3O-$) or, as described in the published European patent application 421.659, by derivatives of boron containing fluorinated groups.

Examples of catalysts for the synthesis of syndiotatic polystyrene indicated in literature are titanium halides (chloride, bromide, etc.), titanium alcoholates (methoxide, ethoxide, propoxide, isopropoxide, butoxide, etc), titanium carboxylates, metallocenes (titanium cyclopentadienyl trichloride, titanium cyclopentadienyl dichloride, titanium pentamethylcyclopentadienyl trichloride, titanium cyclopentadienyl alkoxides, titanium cyclopentadienyl alkyls, titanium pentamethylcyclopentadienyl alkyls, titanium dicyclopentadienyl dichloride, titanium dicyclopentadienyl alkoxides, etc.), titanium alkyls (titanium tetrabenzyl, titanium tetramethyl, titanium tetraethyl, etc.) and the corresponding compounds of zirconium.

The Applicant has now found that it is possible to synthesize crystalline vinylaromatic polymers, and in particular crystalline polystyrene, having a predominantly syndiotactic configuration, using a new catalytic system which has never been described in literature. The catalysts of the present invention also have the property to give polymers with higher degrees of stereoregularity and with much higher molecular weights than the polymers obtained with the traditional catalysts. For example, it is possible to obtain polystyrene with a degree of stereoregularity of more than 99.5% and with weight average molecular weights Mw of more than 300,000, generally between 300,000 and 500,000.

The present invention therefore relates to a process for the preparation of crystalline vinylaromatic polymers with a predominantly syndiotactic structure which comprises polymerizing the vinylaromatic monomers, either alone or mixed with at least one other copolymerizable ethylenically unsaturated monomer, in the presence of a catalytic system consisting essentially of:

a) a complex of titanium having the formula (I):

$$Ti(OCONRR')_n \qquad (I)$$

wherein R and R', the same or different, represent a $C_1$–$C_{12}$ aliphatic radical or $C_6$–$C_{12}$ aromatic radical whereas n is an integer equal to 3 or 4;

b) a cocatalyst selected from aluminoxane and a compound of boron having formula (II):

$$BX_1X_2X_3 \qquad (II)$$

or one of its salts, wherein $X_1$, $X_2$ and $X_3$, the same or different, represent a $C_1$–$C_{20}$ perfluorinated hydrocarbon radical.

The titanium catalyst having general formula (I) is a known product described in "Chemische Berichte" 120, 955 (1987) or in "Journal of Chemical Society: Dalton Transactions", 693 (1991). These products can be prepared by reacting titanium tetrachloride or trichloride with carbon dioxide and with an aliphatic or aromatic diamine.

Non limiting examples of titanium catalysts having general formula (I) which are particularly suitable for the present invention are:

Ti[OCON(CH$_3$)$_2$]$_3$;
Ti[OCON(CH$_3$)$_2$]$_4$;
Ti[OCON(CH$_2$CH$_3$)$_2$]$_3$;
Ti[OCON(CH$_2$CH$_3$)$_2$]$_4$;
Ti[OCON(CH$_2$CH$_2$CH$_3$)$_2$]$_3$;
Ti[OCON(CH$_2$CH$_2$CH$_3$)$_2$]$_4$;
Ti[OCON(CH(CH$_3$)$_2$)$_2$]$_3$;
Ti[OCON(CH(CH$_3$)$_2$)$_2$]$_4$;
Ti[OCON(C$_6$H$_5$)$_2$]$_3$;
Ti[OCON(C$_6$H$_5$)$_2$]$_4$;
Ti[OCON(C$_6$H$_4$CH$_3$)$_2$]$_3$;
Ti[OCON(C$_6$H$_4$CH$_3$)$_2$]$_4$;
Ti[OCON(CH$_3$) (CH$_2$CH$_3$)]$_3$;
Ti[OCON(CH$_3$) (CH$_2$CH$_3$)]$_4$;
Ti[OCON(CH$_3$) (CH$_2$CH$_2$CH$_3$)]$_3$;
Ti[OCON(CH$_3$) (CH$_2$CH$_2$CH$_3$)]$_4$;
Ti[OCON(CH$_3$) (CH(CH$_3$)$_2$)]$_3$;
Ti[OCON(CH$_3$) (CH(CH$_3$)$_2$)]$_4$;
Ti[OCON(CH$_2$CH$_3$) (CH$_2$CH$_2$CH$_3$)]$_3$;
Ti[OCON(CH$_2$CH$_3$) (CH$_2$CH$_2$CH$_3$)]$_4$;
Ti[OCON(CH$_2$CH$_3$) (CH(CH$_3$)$_2$)]$_3$;
Ti[OCON(CH$_2$CH$_3$) (CH(CH$_3$)$_2$)]$_4$;
Ti[OCON(CH$_3$) (C$_6$H$_5$)]$_3$;
Ti[OCON(CH$_3$) (C$_6$H$_5$)]$_4$;
Ti[OCON(CH$_3$) (C$_6$H$_4$CH$_3$)]$_3$;
Ti[OCON(CH$_3$) (C$_6$H$_4$CH$_3$)]$_4$;
Ti[OCON(CH$_2$CH$_3$) (C$_6$H$_5$)]$_3$;
Ti[OCON(CH$_2$CH$_3$) (C$_6$H$_5$)]$_4$

The molar ratio between vinylaromatic monomer and titanium is not particularly critical but can vary between 1,000 and 100,000, preferably between 5,000 and 50,000.

The aluminoxane cocatalyst consists essentially of mixtures of compounds having linear, cyclic or cage-shaped structures. The linear structure has general formula (III):

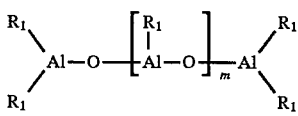

whereas the cyclic structure has general formula (IV):

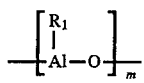

wherein m represents an integer between 1 and 40 and $R_1$ a $C_1$–$C_{20}$ alkyl radical, preferably $C_1$–$C_8$; a $C_6$–$C_{20}$ aryl radical, preferably $C_6$–$C_{12}$; or a $C_7$–$C_{20}$ arylalkyl or alkylaryl radical, preferably $C_7$–$C_{12}$; or a $C_3$–$C_{20}$ cycloalkyl radical, preferably $C_5$–$C_8$; or an O—R' radical, wherein R' represents a $C_1$–$C_8$ alkyl radical, preferably $C_1$–$C_4$; a $C_6$–$C_{20}$ aryl radical, preferably $C_6$–$C_{12}$; or a halogen atom, such as fluorine or bromine, provided that not all the $R_1$ radicals are contemporaneously O—R' or halogens. Cage-shaped structures are disclosed in Macromolecular Symposi, Vol. 97, 1995.

The above cocatalysts, having general formulae (III) and (IV) are known in literature and described, for example, in the published European patent applications 272.584 and 421.659 or in U.S. Pat. No. 4.978.730. The cocatalyst having general formula (II), or its salt, is known in literature and is described in published European patent applications 421.659 and 482.934.

Preferred cocatalysts having general formulae (II), (III) or (IV) are tris(pentafluorophenyl)boron or tetra (pentafluorophenyl)borate of organic cations such as carbon, ammonium, phosphonium triphenyl etc and methylaluminoxane with a number average molecular weight Mn of between 400 and 2000. The cocatalyst is generally used in such quantities that the molar ratio aluminum/titanium is between 50 and 2000 or the ratio boron/titanium is between 0.5 and 5.

According to the process of the present invention, the catalytic system previously described can also comprise an aluminium alkyl wherein the alkyl group contains from 1 to 6 carbon atoms, for example aluminium trimethyl, aluminium triethyl, aluminium triisobutyl, etc., in such quantities that the molar ratio aluminium alkyl/titanium is between 0 and 1,000.

The term "vinylaromatic polymers", as used in the present invention and claims, basically means polymers of styrene and derivatives of styrene and the relative copolymers containing up to 20% in moles of another copolymerizable monomer selected from those having general formula (V):

$$CH_2=CH—R_2$$

wherein $R_2$ represents a hydrogen atom or a $C_1$–$C_6$ alkyl radical, a $C_4$–$C_{12}$ cycloalkyl or aromatic radical.

Derivatives of styrene comprise alkyl styrenes, wherein the alkyl group contains from 1 to 4 carbon atoms, halogenated styrenes, $C_1$–$C_4$-alkoxy styrenes, carboxy styrenes, vinylnaphthalenes, such as alpha- or beta-vinyl naphthalene, vinyl tetrahydro naphthalene such as 1,2,3,4-tetrahydro-6-vinyl naphthalene, etc. Typical examples of substituted styrenes are p-methylstyrene, m-methylstyrene, alone or mixed with each other, ethylstyrene, butylstyrene, p-ter-butylstyrene, dimethylstyrene, chlorostyrene, bromostyrene, fluorostyrene, chloromethylstyrene, methoxystyrene, acetoxy methylstyrene, etc. The polymerization reaction can be carried out in mass or in solvent. In the latter case, the solvent can consist of aliphatic or aromatic hydrocarbons or their mixtures and is used in such quantities that the ratio in volume solvent/monomers is between 0 and 100. The preferred solvent is toluene.

More specifically, according to the general procedure used in this type of reaction, before polymerization, the vinylaromatic monomers are subjected to direct treatment for eliminating catalytic poisons, such as phenolic stabilizers, water, phenylacetylene, and consisting in distillation, passage on columns containing activated molecular sieves or with activated alumina, etc. The monomers and, optionally, the solvent are charged into the reaction equipment together with the possible aluminium alkyl and cocatalyst. After a time varying from 5 seconds to 30 minutes a solution of the derivative of titanium having general formula (I) is added. The reaction continues for times varying from 15 minutes to 20 hours at temperatures of between 0 and 110° C. At the end, the polymer obtained is recovered with the traditional methods.

Some illustrative but not limiting examples are given below to provide a better understanding of the present invention and for its embodiment.

Analysis procedure:

The percentage of syndiotactic polymer is determined by extracting the polymer with acetone or methylethylketone (MEK) at boiling point for 10–20 hours.

The degree of stereoregularity is determined by nuclear magnetic resonance spectroscopy of carbon 13 as described in U.S. Pat. No. 4.680.353.

The thermal transition temperatures (Tm=melting point, Tg=glass transition temperature) are determined by differential scanning calorimetry.

The molecular weights of the polymers obtained were determined by Gel Permeation Chromatography in 1,2,4-trichlorobenzene at 135° C.

EXAMPLE 1

20 ml of styrene, purified by passage on a column of basic alumina, and 1.2 ml of a 1.57M solution in toluene of methylaluminoxane were introduced into a tailed test-tube under an inert atmosphere. After 5 minutes 2.26 ml of an 0.00275M solution in toluene of titanium tris (diisopropylcarbamate) were introduced.

The reaction was carried out for 5 hours at 60° C. At the end, the mixture was suspended in 200 ml of methanol, containing 2 ml of concentrated HCl, and filtered. The solid was again suspended in methanol, filtered and dried under vacuum. 2.24 g (yield 12.3%) of syndiotactic polystyrene were obtained.

Fraction insoluble in methyethylketone (MEK): 76.4%

13-C NMR analysis shows that the polymer has a percentage of 99.5% of syndiotactic dyads.

Thermal properties: Tm=261° C.; Tg=94° C.

Weight average molecular weight Mw: 417,000.

Number average molecular weight Mn: 205,000.

EXAMPLE 2

20 ml of styrene, purified by passage on a column of basic alumina, and 0.8 ml of a 1.57M solution in toluene of methylaluminoxane were introduced into a tailed test-tube under an inert atmosphere. After 5 minutes 2.26 ml of an 0.00275M solution in toluene of titanium tris (diisopropylcarbamate) were introduced.

The reaction was carried out for 5 hours at 60° C. At the end, the mixture was suspended in 200 ml of methanol, containing 2 ml of concentrated HCl, and filtered. The solid was again suspended in methanol, filtered and dried under vacuum. 1.02 g (yield 5.6%) of syndiotactic polystyrene were obtained.

Fraction insoluble in methyethylketone (MEK): 62.5%

13-C NMR analysis shows that the polymer has a percentage of 99.6% of syndiotactic dyads.

Thermal properties: Tm=264° C.; Tg=95° C.

Weight average molecular weight Mw: 423,000.

Number average molecular weight Mn: 184,000.

EXAMPLE 3

20 ml of styrene, purified by passage on a column of basic alumina, and 2.4 ml of a 1.57M solution in toluene of methylaluminoxane were introduced into a tailed test-tube under an inert atmosphere. After 5 minutes 5.75 ml of an 0.00217M solution in toluene of titanium tris (diisopropylcarbamate) were introduced.

The reaction was carried out for 5 hours at 60° C. At the end, the mixture was suspended in 200 ml of methanol, containing 2 ml of concentrated HCl, and filtered. The solid was again suspended in methanol, filtered and dried under vacuum. 1.72 g (yield 9.5%) of syndiotactic polystyrene were obtained.

Fraction insoluble in methyethylketone (MEK): 81.6%

13-C NMR analysis shows that the polymer has a percentage of 99.5% of syndiotactic dyads.

Thermal properties: Tm=267° C.; Tg=98° C.

Weight average molecular weight Mw: 308,000.

Number average molecular weight Mn: 153,000.

EXAMPLE 4

20 ml of styrene, purified by passage on a column of basic alumina, and 1.2 ml of a 1.57M solution in toluene of methylaluminoxane were introduced into a tailed test-tube under an inert atmosphere. After 5 minutes 3.0 ml of an 0.00211M solution in toluene of titanium tetrakis (diisopropylcarbamate) were introduced.

The reaction was carried out for 5 hours at 60° C. At the end, the mixture was suspended in 200 ml of methanol, containing 2 ml of concentrated HCl, and filtered. The solid as again suspended in methanol, filtered and dried under vacuum. 3.02 g (yield 16.5%) of syndiotactic polystyrene were obtained.

Fraction insoluble in methyethylketone (MEK): 71.5%

13-C NMR analysis shows that the polymer has a percentage of 99.5% of syndiotactic dyads.

Thermal properties: Tm=265° C.; Tg=96° C.

Weight average molecular weight Mw: 383,000.

Number average molecular weight Mn: 192,000.

EXAMPLE 5

694 ml of styrene, purified by passage on a column of basic alumina were charged into a one liter reactor under an inert atmosphere. The styrene was brought to 60° C. and 41.7 ml of a 1.57M solution in toluene of methylaluminoxane and 125 mf of titanium tetrakis (diisopropylcarbamate) dissolved in 20 ml of toluene were added.

The reaction was carried out for 5 hours at 60° C. At the end, the mixture was suspended in 1 l of ethanol, containing 8 ml of concentrated HCl, and filtered. The solid was again suspended in ethanol, filtered and dried under vacuum. 94.3 g (yield 14.9%) of syndiotactic polystyrene were obtained.

Fraction insoluble in methyethylketone (MEK): 84.8%

13-C NMR analysis shows that the polymer has a percentage of 99.6% of syndiotactic dyads.

Thermal properties: Tm=267° C.; Tg=99° C.

Weight average mclecular weight Mw: 348,000.

Number average mclecular weight Mn: 155,000.

COMPARATIVE EXAMPLE

Under analogous experimental conditions as those in examples 1 and 4, a polymerization was carried out using cyclopentadienyltitaniumtrichlorideo 5.98 g (yield 32.9%) of syndiotactic polystyrene were obtained.

Fraction insoluble in methyethylketone (MEK): 87.0%

13-C NMR analysis shows that the polymer has a percentage of 98.1% of syndiotactic dyads.

Thermal properties: Tm=252° C.; Tg=97° C.

Weight average molecular weight Mw: 105,000.

Number average molecular weight Mn: 44,000.

We claim:

1. Process for the preparation of crystalline vinylaromatic polymers with a predominantly syndiotactic structure which comprises polymerizing a vinyl-aromatic monomer, either alone or mixed with at least one other copolymenizable ethylenically unsaturated monomer, in the presence of a catalytic system consisting essentially of:

a) a complex of titanium having the formula (I)

$$\mathrm{Ti\,(OCONRR')}_n \qquad (I)$$

wherein R and R', being the same or different, represent a $C_1$–$C_{12}$ aliphatic radical or $C_6$–$C_{20}$ aromatic radical; and wherein n is an integer equal to 3 or 4;

b) a cocatalyst selected from aluminoxane and a compound of boron having formula (II):

$$BX_1X_2X_3 \qquad (II)$$

or one of its salts, wherein $X_1$, $X_2$ and $X_3$, being the same or different, represent a $C_1$–$C_{20}$ perfluorinated hydrocarbon radical.

2. Process according to claim 1, wherein the molar ratio between said vinylaromatic monomer and said titanium is between 1,000 and 100,000.

3. Process according to claim 1, wherein said cocatalyst is used in such quantities that the molar ratio aluminium/titanium is between 50 and 2000 or the ratio boron/titanium is between 0.5 and 5.

4. Process according to claim 1, wherein said catalytic system comprises an aluminum alkyl wherein the alkyl group contains from 1 to 6 carbon atoms.

5. Process according to claim 4, wherein the molar ratio aluminium alkyl/titanium is between 0 and 1,000.

6. Process according to claim 1, wherein said polymerizing is carried out in mass or in a solvent.

7. Process according to claim 6, wherein said solvent is present in a quantity that the ratio in volume solvent/monomers is between 0 and 100.

8. Process according to claim 1, wherein said polymerizing is carried out at temperatures of between 0° and 110° C.

* * * * *